United States Patent [19]
Semchenko et al.

[11] 3,859,104
[45] Jan. 7, 1975

[54] METHOD OF PRODUCING CEMENT CLINKER AND BINDER CONTAINING GROUND CEMENT CLINKER PRODUCED BY THIS METHOD

[76] Inventors: Ivan Alexandrovich Semchenko, ulitsa Bukbarestskaya 34/4, kv. 83; Alexandr Fedorovich Semendyaev, prospekt Gagarina, 27, kv. 310, both of Leningrad; Konstantin Grigorievich Ivanov, ulitsa Vokzskaya 28, kv. 35; Georgy Petrovich Tkachenko, ulitsa Sporinskaya, kv. 14, both of Pikalovo Leningradskoi Oblasti; Nikolai Pavlovich Shteiert, ploschad Chernyshevskogo, 7, kv. 47, Leningrad, all of U.S.S.R.

[22] Filed: Aug. 24, 1972

[21] Appl. No.: 283,271

Related U.S. Application Data
[63] Continuation of Ser. No. 116,613, Feb. 18, 1971, abandoned.

[52] U.S. Cl. ............................................. 106/103
[51] Int. Cl. ............................................ C04b 7/04
[58] Field of Search ................... 106/103, 120, 100

[56] References Cited
FOREIGN PATENTS OR APPLICATIONS
| 154,165 | 8/1963 | U.S.S.R. | 106/103 |
| 240,662 | 9/1960 | Australia | 106/100 |

*Primary Examiner*—Delbert E. Gantz
*Assistant Examiner*—James W. Hellwege
*Attorney, Agent, or Firm*—Holman & Stern

[57] ABSTRACT

A method is proposed for producing a cement clinker, the essence of which consists of the use of an initial mixture containing 60–80 percent by weight of belite slime and 20–40 percent by weight of carbonate rocks. The initial mixture is roasted at a temperature of from 1300–1550°C.

A binder is also proposed containing: a cement clinker produced by the above-said method in the amount of from 25–85 parts by weight, a dehydrated belite slime in the amount of 15–75 parts by weight and gypsum in the amount of up to 3.0 parts by weight (above 100 parts as calculated for $SO_3$).

2 Claims, No Drawings

METHOD OF PRODUCING CEMENT CLINKER AND BINDER CONTAINING GROUND CEMENT CLINKER PRODUCED BY THIS METHOD

This is a continuation, of application Ser. No. 116,613, filed Feb. 18, 1971, now abandoned.

The present invention relates to cement production and, more particularly, the invention is directed to a method of producing a cement clinker and a binder containing a ground cement clinker produced by the same method.

Methods for producing a cement clinker from an initial mixture containing belite slime obtained from complex processing of nepheline concentrates, and carbonate rocks (limestone, chalk, etc.) are known in the art.

Such initial mixtures usually contain from 57-59 weight percent of belite slime, more than 40 percent of limestone and from 0.5-3.0 percent of mineralizers (fluorite, gypsum, etc.).

In order to produce a cement clinker, pre-ground limestone, in conjunction with belite slime and mineralizer, are crushed in a mill.

The mixture is then corrected to a predetermined chemical composition in a basin.

The prepared initial mixtures are roasted in rotary furnaces at a temperature range within the clinkering zone of from 1350-1450°C.

The above-mentioned initial mixture has a low melting point; therefore, the cement clinker produced therefrom is characterized by a coarse-grained structure of its components (tri-calcium and bi-calcium silicates, tri-calcium aluminate, etc.) and has a high mechanical strength, i.e., is hard to grind.

In addition, when roasting such an initial mixture, the clinkering thereof is effected within limited distribution within the furnace resulting in local overheating of the furnace refractory lining.

The known method of producing a cement clinker is also disadvantageous in that it is associated with the use of mineralizers taken in accurately dosed small quantities which considerably complicates the process of preparing the mixture.

The disadvantage of the known method for producing a cement clinker using belite slime obtained from the complex processing of the nepheline concentrates in producing alumina, sodium carbonate and potash consists in an insufficiently high specific consumption of belite slime. As 7 to 9 tons of belite slime are used in the production of 1 ton of alumina, there is an unfavorable capacity ratio of the cement and alumina production lines.

A binder containing 50-70 parts by weight of cement clinker, 30-50 parts of dehydrated belite slime obtained from the complex processing of nepheline concentrates, and 6 parts of gypsum is also known in the art.

The cement clinker used in this binder is characterized by a silicate modulus of from 1.96-2.4, and an alumina modulus of from 1.42-1.18, i.e., contains an increased amount of tricalcium aluminate (higher than 8 percent).

This, however, reduces the setting time of the binder produced through the use of such a clinker and lowers its corrosion resistance (sulphate- and acid-resistance), which fact limits its field of application.

The principal object of this invention is to work out a method of producing a cement clinker which would have a finely ground structure of the constituent minerals, and a high porosity which provides for an increased efficiency of furnace roasting and milling, and also which produces a binder wherein the relationship between the constituent components makes it possible to increase its setting time and the sulphate- and acid-resistance, thus widening the field of application thereof.

According to this and other objects, in the process of producing a cement clinker from an initial mixture containing a belite slime which is the product of the complex processing of nepheline concentrates and carbonate rocks including the steps of disintegrating the raw mixture component mixture followed by mixing and roasting said components, according to the invention, the initial mixture used contains from 60-80 wt percent of belite slime, and from 20-40 wt percent of carbonate rocks. The binder consists of a ground cement clinker produced in the manner described above, dehydrated belite slime and gypsum, and according to the invention, includes the following quantities of the above binder components (parts by weight):
cement clinker 20-85
dehydrated belite slime 15-75
gypsum as calculated for $SO_3$ up to 3.5

The essence of the proposed invention resides in the following:

Previously, in the production of a cement clinker only the chemical composition of its components was taken into account without considering their mineralogical composition. However, one of them, belite slime, is a product of a complex heat rendering method of nepheline concentrates which contains up to 85 percent of dicalcium silicate.

In this connection, the use of an initial mixture containing from 60-80 wt percent of belite slime and from 20-40 wt percent of carbonate rocks, makes it possible to eliminate the use of the mineralizer, thus substantially simplifying the process of the preparation of the raw mixture, and providing for a possibility for correcting the composition of the raw mixture solely by the degree of saturation.

Furthermore, such a mixture makes it possible to reduce losses during roasting due to a decrease in the specific consumption of the carbonate rocks, thus increasing the furnace capacity up to 10 percent and reducing the consumption of fuel for roasting (approximately by 6 percent).

The increase in the specific consumption of the belite slime in the initial mixture allows a process having a low liquid phase content which makes possible the production of a clinker having a silicate modulus exceeding 2.6. Therefore, the clinker produced features an increased amount (up to 80-90 percent) of the calcium silicates and low amounts (up to 6-10 percent) of tricalcium aluminate and tetracalcium alumoferrite.

Tricalcium silicate (alite) features a fine-grained structure having a crystal size of from 15-30 microns.

The clinker of such a mineralogical composition is characterized by a fine-grained structure and high porosity (up to 40 percent); therefore, it can be easily ground, thus increasing the efficiency of the mills (up to 10 percent).

As the proposed binder contains from 25-85 percent by weight cement clinker produced by the above-described method which has a low tetracalcium alumoferrite and tricalcium aluminate content (the content of the latter may be practically zero), the content of belite slime as a mineral addition may be increased up to 75 percent by weight, while reducing the consumption of gypsum as calculated on $SO_3$ up to 3.0 percent by weight to control the setting time.

Increasing the amount of calcium silicates and reducing the amount of tetracalcium alumoferrite and tricalcium aluminate increases the setting time of the binder produced, and also increases its sulphate-resistance and acid-resistance, as well as reducing the heat evolved during the solidification thereof.

Given below are some exemplary embodiments of the method of producing the cement clinker and the binder.

EXAMPLE 1

In order to produce a cement clinker, a belite slime was used, characterized by the following chemical composition (percent by weight)

| | | | |
|---|---|---|---|
| $SiO_2$ | 29.8 | CaO | 57.65 |
| $Al_2O_3$ | 2.23 | MgO | 1.3 |
| $Fe_2O_3$ | 2.86 | $R_2O$ | 2.1 |

(roasting losses – 2.69) and a carbonate rock, characterized as having the following oxide content (percent by weight):

| | | | |
|---|---|---|---|
| $SiO_2$ | 2.0 | CaO | 52.35 |
| $Al_2O_3$ | 0.66 | MgO | 0.90 |
| $Fe_2O_3$ | 0.99 | the remainder | 1.35 | the roasting losses are 41.75

These components were introduced into a grinding mill. Belite slime was then supplied in an amount of about 80% by weight and carbonate rocks of about 20% by weight.

The raw mixture was pumped from the mill to basins wherein it was subjected to pneumatic stirring. A chemical analysis of the raw mixture was effected and the chemical composition of the mixture was corrected to provide for a predetermined compound.

Given in Table 1 are the characteristics of the raw mixture and the consumption of the components per ton of clinker.

The initial mixture was fed from the basin through a batcher into a rotary furnace 3.6 m in diameter and 60 m in length wherein the mixture was roasted at a temperature of 1300–1350°C.

Given in Table 2 is the mineralogical composition of the produced cement clinker and its properties.

EXAMPLE 2

A cement clinker was produced from belite slime and carbonate rock having the above-given compositions. Belite slime was taken in an amount of about 70 percent by weight, while the carbonate rock was taken in an amount of about 30 percent by weight. The characteristic of the raw mixture and the consumption of the components are given in Table 1, example 2.

The raw mixture was prepared as described in Example 1 and was roasted in a rotary furnace at a temperature of from 1350–1480°C.

The mineralogical composition of the produced cement clinker and its properties are given in Table 2, example 2.

EXAMPLE 3

A cement clinker was produced from a raw mixture consisting of 60 wt percent of belite slime of the above-mentioned composition, and 40 wt percent of carbonate rock characterized by roasting losses of 41.99 percent, and the content of oxides (in percent by weight) are:

| | | | |
|---|---|---|---|
| $SiO_2$ | – 1.0 | CaO | – 53.33 |
| $Al_2O_3$ | – 0.63 | the remainder | – 2.36 |
| $Fe_2O_3$ | – 0.69 | | |

The characteristic of the raw mixture and the consumption of the components are given in Table 1, Example 3.

The roasting of the raw mixture having the corrected composition was effected at a temperature of 1480°–1550°C using fuel ash having the following composition (% by weight):

| | | | |
|---|---|---|---|
| $SiO_2$ | – 55.07 | CaO | – 6.27 |
| $Al_2O_3$ | – 21.57 | MgO | – 3.41 |
| $Fe_2O_3$ | – 8.46 | $SO_3$ | – 2.01 |
| | | the remainder | – 3.21 |

Table 1

| Example | Characteristic of raw mixture | | | No. of losses at roasting | Consumption of components per ton of clinker | |
|---|---|---|---|---|---|---|
| | degree of saturation | silicate modulus | alumina modulus | | carbonate rock | belite slime |
| 1 | 0.79 | 5.4 | 0.79 | 9.40 | 0.233 | 0.88 |
| 2 | 0.88 | 5.22 | 0.78 | 14.75 | 0.362 | 0.811 |
| 3 | 0.89 | 3.31 | 1.01 | 18.08 | 0.48 | 0.739 |

Table 2

| Example | Mineralogical composition of clinker in % by weight | | | | | Characteristics | | | | | | | | |
|---|---|---|---|---|---|---|---|---|---|---|---|---|---|---|
| | | | | | | clinker | | | | cement | | | | |
| | $C_3S$ | $C_2S$ | $C_3A$ | $C_4AF$ | CaO | Degree of saturation | silicate modulus | alumina modulus | porosity, % | remainder on sieve % | | compression strength kg/cm² after days | | |
| | | | | | | | | | | 02 | 008 | 3 | 7 | 28 |
| 1 | 34.8 | 51.0 | 1.1 | 8.4 | 0.4 | 0.78 | 5.3 | 0.78 | 25 | 1.0 | 7.0 | 210 | 328 | 388 |
| 2 | 60.5 | 25.7 | 1.0 | 8.1 | 0.3 | 0.88 | 5.1 | 0.8 | 35 | 0.6 | 6.6 | 267 | 368 | 421 |
| 3 | 59.1 | 22.0 | 3.4 | 10.6 | 0.5 | 0.89 | 3.3 | 1.0 | 40 | 0.6 | 7.2 | 257 | 352 | 407 |

The mineralogical composition of the produced cement clinker and its properties are given in Table 2, example 3.

The cement clinker described in Example 2 was ground either alone or in conjunction with predehydrated belite slime by mixing this slime with a gypsum binder for the prepared mixture.

In this case the belite slime has the following chemical composition (% by weight):

| | | | |
|---|---|---|---|
| $SiO_2$ | – 29.65 | $CaO$ | – 56.54 |
| $Al_2O_3$ | – 3.38 | $R_2O$ | – 0.09 |
| $Fe_2O_3$ | – 4.0 | $SO_3$ | – 0.09 |
| | the remainder – 2.98 | | | with the roasting losses – 1.43.

The component compositions of the binder and its properties are given in Table 3.

Due to this fact the proposed binder can be widely used not only in civil and industrial engineering but also in hydrotechnical engineering.

As shown in Tables 1 and 3, the specific consumption of the belite slime is rather high both during the production of the cement clinker (up to 80 percent) and in the composition of the binder (up to 75 percent).

This fact has changed the power ratio between the cement and alumina production works, i.e., in this case it is possible to utilize the belite slime produced in a large quantity from the process of complex processing of nepheline concentrates which increases (almost by a factor of 2) the yield of alumina at the same output for the cement.

What is claimed is:

1. A binder consisting essentially of 25–85 parts by weight of a ground cement clinker produced from an initial mixture containing 60–80 percent by weight of

Table 3

| Component composition, % by weight | | | Water-to-cement ratio | Deliquescence of cone in mm | Bending strength, kg/cm² | | | | | | Compression strength, kg/cm² | | | | | |
|---|---|---|---|---|---|---|---|---|---|---|---|---|---|---|---|---|
| | | | | | age | | | | | | age | | | | | |
| cement clinker | dehydrated belite slime | gypsum | | | 3 days | 7 days | 28 days | 3 months | 6 months | 1 year | 3 days | 7 days | 28 days | 3 months | 6 months | 1 year |
| 85 | 15 | 3 | 0.40 | 109–110 | 40.3 | 49.9 | 61.6 | 65.5 | 70.6 | 75.1 | 218 | 259 | 364 | 442 | 508 | 591 |
| 70 | 30 | 3 | 0.40 | 105–106 | 36.5 | 43.7 | 63.8 | 72.8 | 74.0 | 78.5 | 180 | 250 | 343 | 436 | 508 | 599 |
| 55 | 45 | 2 | 0.43 | 103–109 | 25.4 | 33.3 | 49.5 | 70.4 | 76.1 | 76.2 | 98 | 182 | 301 | 437 | 503 | 562 |
| 50 | 50 | 2 | 0.43 | 105–106 | 23.6 | 33.9 | 48.3 | 70.6 | 77.3 | 78.4 | 103 | 163 | 275 | 423 | 503 | 655 |
| 40 | 60 | 3 | 0.46 | 107–107 | 16.1 | 25.7 | 33.7 | 60.8 | 68.8 | 74.4 | 69 | 114 | 218 | 344 | 430 | 554 |
| 25 | 75 | 3 | 0.48 | 105–105 | 10.1 | 17.0 | 32.0 | 48.9 | 58.0 | – | 38 | 79 | 165 | 243 | 323 | – |

The technical properties of the binder produced were evaluated by various parameters, i.e., selecting the proper water-to-cement ratio, determining the mobility of the cement mortar followed by the preparation of beam-shaped specimens sized at 4 × 4 × 16 mm, their storage time evaluated, and tests for bending and compression strength. As can be seen from Table 1, the higher the quantity of the belite slime, the less the consumption of the carbonate rock, and the higher the clinker yield due to reduction of the losses during the roasting of the raw mixtures which provides for a corresponding increase in the efficiency of the furnaces.

The produced cement clinker is characterized by a high porosity (up to 40 percent) and a fine-grained (5–10 mu) and a medium-grained (20–30 mu) slime structure and this fact alone provides for an increase in the efficiency of the mill units.

The reduced content of tricalcium aluminate (0.9–1.1 percent by weight) and tetracalcium alumoferrite (7.9–8.4 percent by weight) in the cement, as shown in Table 2, improves its sulphate and acid resistance.

belite slime produced during the complex processing of nepheline concentrates, and 20–40 percent by weight of carbonate rocks said initial mixture having been roasted at a temperature of 1300°–1550°C, 15–75 parts by weight of dehydrated belite slime and up to 3 parts by weight of gypsum.

2. A method of producing a binder containing cement clinker, which comprises mixing:

A. 25–85 parts by weight of ground cement clinker containing 80–90 percent by weight of fine-grained bi- and tri-calcium silicates and 6–10 percent by weight of tetracalcium alumoferrite and tri-calcium aluminate, said clinker being obtained by roasting at 1300°–1550°C a two-component mixture containing 60–80 percent by weight of belite slime and 20–40 percent by weight of carbonate rock;

B. 15–75 parts by weight of dehydrated belite slime, the amount of (A) and (B) together comprising 100 parts by weight; and C. Gypsum in the amount of three parts by weight of the initial clinker as calculated for $SO_3$.

* * * * *